Patented Nov. 5, 1940

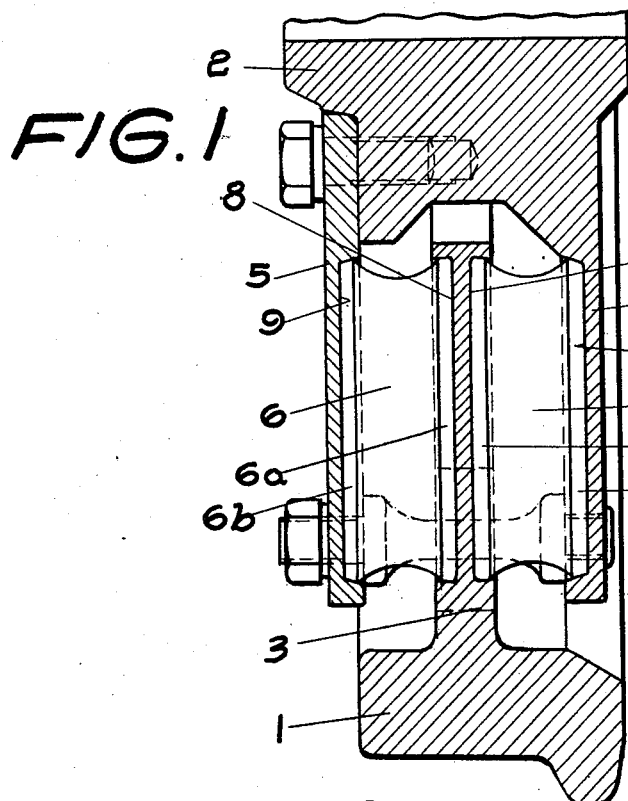
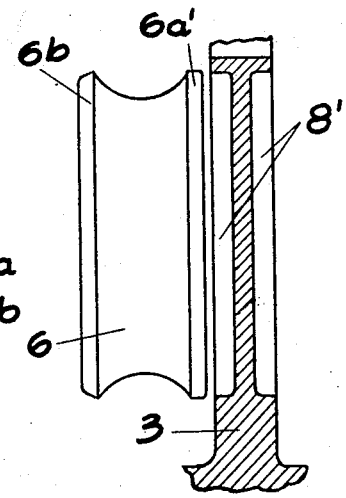
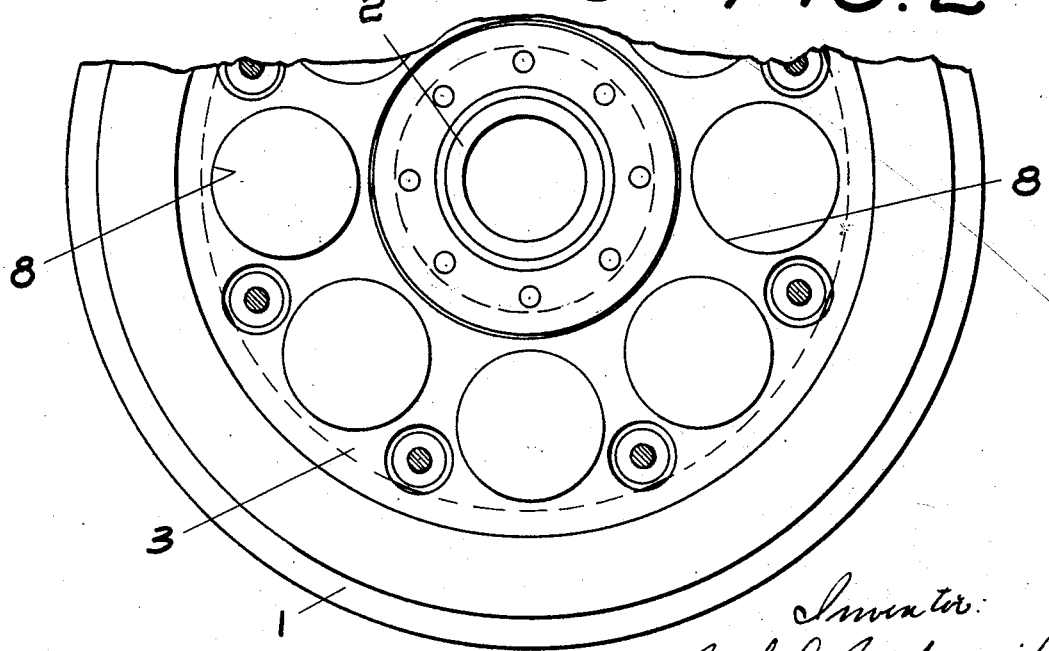

2,220,417

UNITED STATES PATENT OFFICE 2,220,417

RESILIENT WHEEL

Nils Gunnar August Malmquist, Malmo, Sweden, assignor to Svenska Aktiebolaget Bromsregulator, Malmo, Sweden, a corporation of Sweden Application June 18, 1938, Serial No. 214,539

5 Claims. (Cl. 295—11)

This invention relates to resilient wheels, especially street or railway car wheels, of the kind in which flexible rubber blocks are disposed between axially spaced overlapping flanges on the hub and rim members of the wheel and have their ends seated in normally coaxial substantially shallow recesses in the facing sides of said flanges. A resilient wheel of this kind is shown and described in my U. S. Patent No. 2,086,720.

In hitherto known wheel constructions of this kind it was necessary, in order to assemble the wheel, to remove the wheel axle from the car and place it in an upright position, with the wheel plane horizontal. Only in this manner it was possible to keep the rows of rubber blocks in place on one of the flanges while positioning the next flange over them, as more fully described in the aforesaid U. S. Patent No. 2,086,720.

One object of the present invention is to eliminate the necessity of performing the aforesaid rather complicated operation each time the wheels of the car have to be dismantled and reassembled for inspection or renewal of the rubber blocks.

Another object of the invention is to make possible inspection and renewal of the rubber blocks simply by jacking up the desired wheel and dismantling and reassembling it in situ without removing the wheel axle from the car.

A further object of the invention is to shape the recesses for the opposite ends of the rubber blocks in the facing sides of the flanges differently so that, in assembling the wheel, the blocks may be steadily inserted and kept in place with one end in the recesses in one of the facing sides while the recesses in the other of the facing sides permit easy introduction of the other ends of the blocks.

A still further object of the invention is to shape the opposite ends of the blocks differently comforming to the different shapes of the recesses in the facing sides of the flanges between which the blocks are disposed.

With these and other objects which will become apparent from the detailed description below the invention is more specifically described herein below, claimed in the claims and shown in the drawing in which:

Fig. 1 is an axial section through a part of a resilient wheel constructed in accordance with the invention.

Fig. 2 is a partial lateral elevation of the wheel with one of its hub flanges and the adjacent row of rubber blocks removed.

Fig. 3 is a view of a modified form of rubber block and also shows a correspondingly modified form of the recess for receiving one end of this block.

Referring to the drawing, 1 designates the wheel rim and 2 indicates the hub. The rim has an inwardly directed flange 3 and the hub has the outwardly directed flanges 4 and 5 disposed on both sides of the inwardly directed flange 3 of the rim. Between the inwardly directed flange 3 and the outwardly directed flanges 4 and 5 are provided the rubber blocks 6 which are preferably of circular cross section and which have their ends seated in normally coaxial substantially shallow recesses 8 and 9 provided in the facing sides of the flanges.

In order to permit the assembling and dismantling of the wheel one of the flanges on the hub 2 is made removable and is secured in position by means of bolts or screws 7. In the drawing the flange 5 is indicated as being removable.

In the form of the invention shown in the drawing for the purpose of illustration the recesses 8 in the middle flange 3 are made slightly widening towards the bottom, so that the corresponding ends 6a of the rubber blocks 6, which preferably are of a shape conforming to the shape of the recesses 8, can be inserted in the recesses 8 only by using a certain amount of force and, once inserted, do not fall away again. The recesses 9 in the outer flanges 4 and 5, on the other hand, are shaped in the known manner for easy introduction of the corresponding end portions 6b of the rubber blocks. In other words, the recesses 8 are slightly under-cut, and the end portions 6a of the blocks, which are inserted in the recesses 8, widen towards their free ends, whereas the recesses 9 are slightly tapered towards their bottoms so that the corresponding end portions 6b of the blocks, which are seated in the recesses 9 and are slightly tapered towards their free ends, easily can be introduced into the recesses 9 at the assembling of the wheel.

In the modified form of the invention illustrated in Fig. 3 the flange 3 is provided with substantially cylindrical recesses 8', and the corresponding end portions 6a' of the blocks 6 are also substantially cylindrical but, in their free state, of a diameter slightly greater than the diameter of the cylindrical recesses 8'. The opposite end portions 6b and the recesses for receiving them are as described with reference to Figs. 1 and 2 and as shown therein.

Dismantling and reassembling of the wheel can be performed in situ, without removing the wheel axle from the car, simply by jacking up the wheel. When assembling the wheel, both rows of rubber blocks 6 are first put into place in the recesses 8 in the flange 3 on the rim portion of the wheel, whereafter the rim portion of the wheel is pushed over the hub so that the free ends of the blocks adjacent the hub flange 4 are introduced into the recesses 9 of the flange 4. Then the removable hub flange 5 is placed in position so that the free ends of the blocks adjacent the flange 5 are introduced into the recesses 9 of the flange 5, and the bolts and nuts are tightened.

During this assembling of the wheel the axle thereof is substantially horizontal and, consequently, the wheel plane substantially vertical and, therefore, it is essential that the blocks are held steadily in place when inserted with one end in the recesses 8 in the flange 3, in order that the other ends of the blocks may enter the recesses 9 in the flanges 4 and 5 when the rim portion of the wheel is pushed on the hub and the removable flange 5 is placed in position. The different shapes given to the recesses 8 and 9 for the opposite end portions 6a and 6b of the blocks and the correspondingly different shapes given to the opposite end portions 6a and 6b of the blocks as above described has been found to be a practical solution of the problem. It was tried to keep the rubber block in place on one of the flanges at the assembling of the wheel by provisionally securing the blocks in the recesses of the flange by means of a rubber cement, but without success, and further when using a rubber cement the presence of the solvent thereof in the recesses most probably would be detrimental to the rubber blocks.

What I claim and desire to secure by Letters Patent is:

1. A resilient wheel construction comprising a hub member and a rim member, axially spaced overlapping flanges on said members having a plurality of normally coaxial substantially shallow recesses in their facing sides, flexible rubber blocks disposed between said flanges and having end portions seated in said recesses, the recesses for the opposite end portions of the rubber blocks in the facing sides of the flanges being differently shaped so that, in assembling the wheel, the blocks may be steadily inserted and kept in place with one end in the recesses in one of the facing sides while the recesses in the other of the facing sides permit easy introduction of the other ends of the blocks.

2. A resilient wheel construction comprising a hub member and a rim member, axially spaced overlapping flanges on said members having a plurality of normally coaxial substantially shallow recesses in their facing sides, flexible rubber blocks disposed between said flanges and having end portions seated in said recesses, the recesses for one of the opposite ends of the rubber blocks being slightly under-cut and the recesses for the other ends of the rubber blocks being slightly tapered towards their bottoms.

3. A resilient wheel construction comprising a hub member and a rim member, axially spaced overlapping flanges on said members having a plurality of normally coaxial substantially shallow recesses in their facing sides, flexible rubber blocks disposed between said flanges and having end portions seated in said recesses, the recesses for one of the opposite ends of the blocks being under-cut, the end portions of the blocks seated in said under-cut recesses being of a shape conforming to the shape of said under-cut recesses, and the other ends of the blocks and the recesses for said other ends being shaped so as to permit easy introduction of said other ends in the recesses for them.

4. A resilient wheel construction comprising a hub member and a rim member, an inwardly directed flange on said rim member, outwardly directed flanges on said hub member disposed on both sides of and axially spaced from the flange on the rim member, one of the flanges on the hub member being removably mounted thereon to permit assembling and dismantling of the wheel, said flanges being provided in their facing sides with a plurality of normally coaxial substantially shallow recesses, flexible rubber blocks disposed between said flanges and having end portions seated in said recesses, the recesses in the opposite sides of the middle flange provided on the rim member being under-cut so that they are slightly widening towards their bottoms, the recesses in the sides of the hub flanges facing the rim flange being slightly tapered towards their bottoms, and the opposite end portions of the blocks being differently shaped conforming to the differently shaped recesses in the rim and hub flanges, in which they are seated.

5. A resilient wheel construction comprising a hub member and a rim member, axially spaced overlapping flanges on said members having a plurality of normally coaxial substantially shallow recesses in their facing sides, the recesses in one of the facing sides being substantially cylindrical and the recesses in the opposing side being slightly tapered towards their bottoms, flexible rubber blocks disposed between said flanges and having end portions seated in said recesses, the end portions seated in the substantially cylindrical recesses being substantially cylindrical and, in their free state, of a diameter slightly greater than the diameter of the cylindrical recesses, and the end portions seated in the tapering recesses being correspondingly tapered.

NILS GUNNAR AUGUST MALMQUIST.